United States Patent [19]

Hewson

[11] 3,916,535
[45] Nov. 4, 1975

[54] NECK ASSEMBLY FOR MANNEQUIN
[75] Inventor: Carl Hewson, Marshfield, Mass.
[73] Assignee: Brunswick Manufacturing Co., Inc., North Quincy, Mass.
[22] Filed: Jan. 7, 1974
[21] Appl. No.: 431,019

[52] U.S. Cl. .................................. 35/17; 251/352
[51] Int. Cl.² ........................................ G09B 23/28
[58] Field of Search ..................... 35/17; 251/352

[56] References Cited
UNITED STATES PATENTS
| 610,976 | 9/1898 | Schionning | 251/352 X |
| 2,564,427 | 8/1951 | De Rugeris | 251/352 X |
| 3,049,811 | 8/1962 | Ruben | 35/17 |
| 3,199,225 | 8/1965 | Robertson | 35/17 |
| 3,562,924 | 2/1971 | Baermann | 35/17 |

Primary Examiner—Harland S. Skogquist
Attorney, Agent, or Firm—Wolf, Greenfield & Sacks

[57] ABSTRACT

A mannequin for demonstrating resuscitation comprising a body and head joined by a connecting member which enables the head to be pivoted back and forth and turned side to side. A passage in the head is placed in registration with a passage in the connecting member so as to allow air to flow through the nose and mouth of the mannequin when the head is in a position which corresponds to the proper position of head of a human who is to receive resuscitation.

1 Claim, 7 Drawing Figures

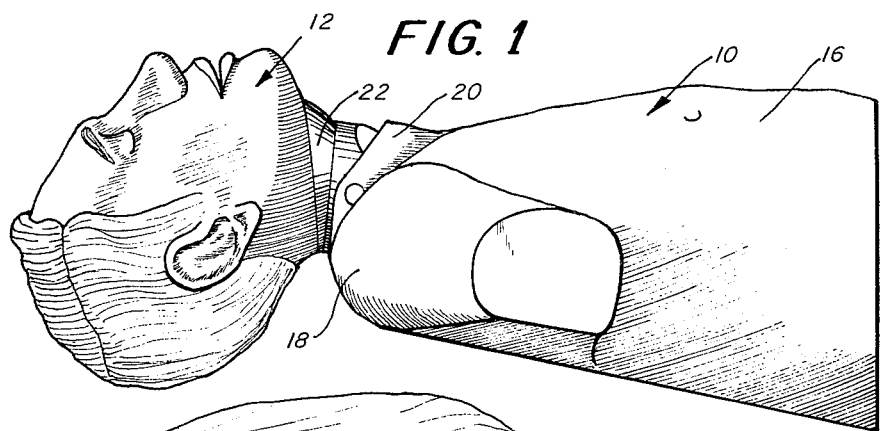
FIG. 1
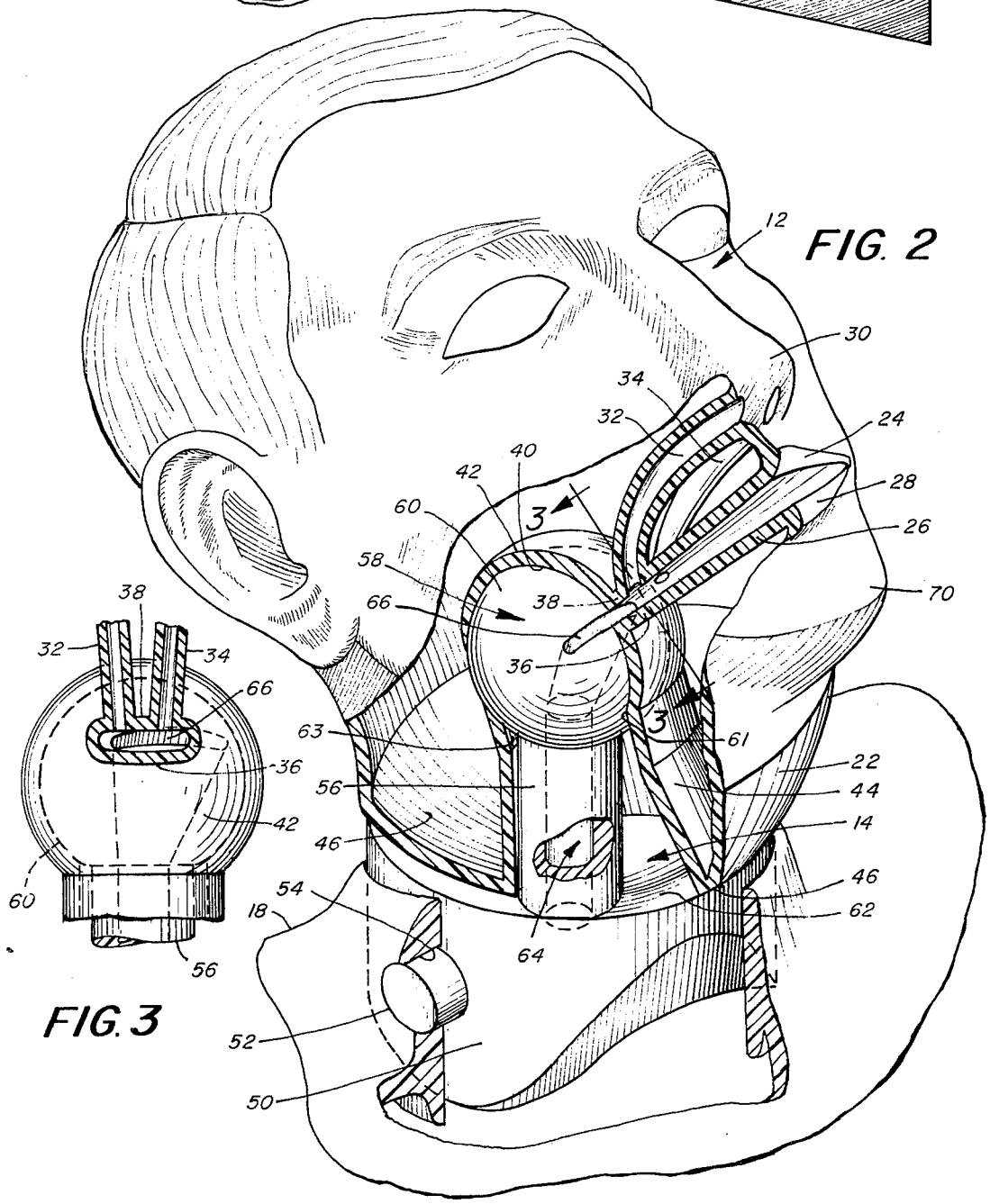
FIG. 2
FIG. 3

NECK ASSEMBLY FOR MANNEQUIN

BACKGROUND OF THE INVENTION

The mannequin of this invention is an aid in teaching either mouth to mouth resuscitation or the use of automatic or semi-automatic devices for that purpose.

It is well known that it is essential to properly position the head in order to apply resuscitation to a human being. If the head is not in the proper position, the airway is not open sufficiently to allow air or oxygen to be fed to the lungs to stimulate or assist normal breathing. The head must be tilted back in order to open the airway, and in cases where the lungs contain water and must be emptied it is also desirable to tilt the head to the side so that expelled water may literally spill from the mouth.

Those mannequins now available for use as teaching aids in connection with resuscitation are quite expensive, normally costing several hundreds of dollars, and they do not teach the proper head position for the application of resuscitation. Because they are very expensive, they are not available to many institutions that could benefit greatly by having them.

An important object of this invention is to provide a mannequin which may be manufactured inexpensively and which teaches the student how to properly position the head for the application of ventilation.

Another important object of this invention is to provide a mannequin used as a teaching aid, which is so designed that if the head is not properly positioned, ventilation cannot be applied. Thus the student is very abruptly made aware of the fact that he has not complied with the very first requirement for proper ventilation, namely, the precise positioning of the victim's head.

To accomplish these and other objects, the mannequin of this invention is provided with a special connecting device between the torso and the head, which not only permits movement of the head on the torso in a manner which simulates normal head movement of a human, but acts as a valve as well to connect the nasal and mouth passages to the chest cavity of the torso only when the head is properly positioned ventilation.

BRIEF FIGURE DESCRIPTION

FIG. 1 is a side view of the mannequin constructed in accordance with this invention;

FIG. 2 is a perspective view with parts broken away and on an enlarged scale of the mannequin shown in FIG. 1 with one form of nasal passage.

FIG. 3 is a fragmentary cross sectional view taken along section line 3—3 of FIG. 2;

Figure 5:
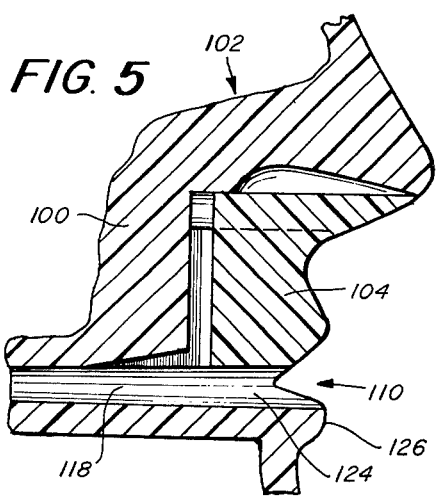
Figure 4:
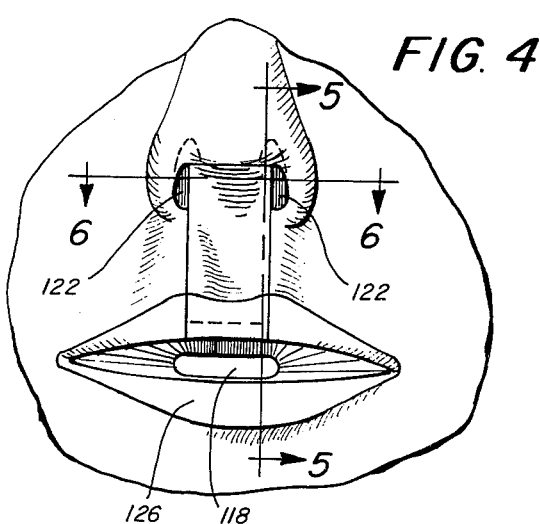
FIG. 4 is a front view of the nose and mouth area of a mannequin head with a preferred form of nasal passage.
Figure 7:
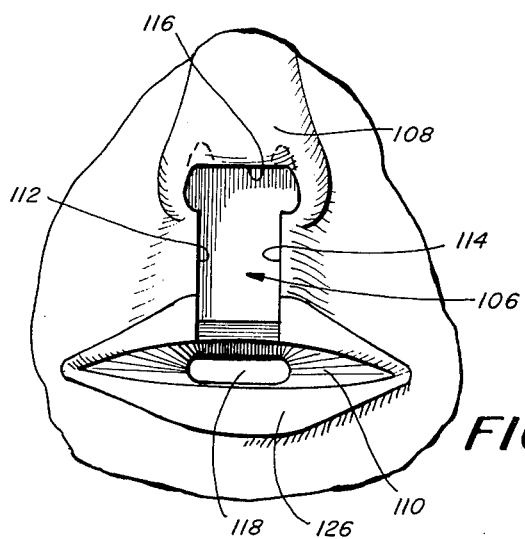
Figure 6:
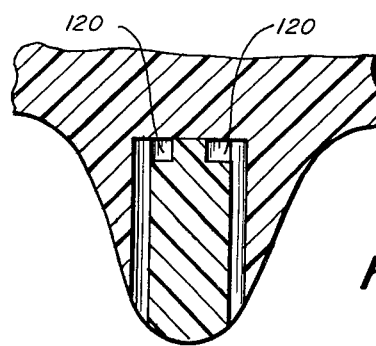

FIGS. 5 and 6 are fragmentary cross sectional views taken along section lines 5—5 and 6—6 of FIG. 4; and FIG. 7 is similar to FIG. 4 with a portion of the nose-mouth area removed.

DETAILED DESCRIPTION

The mannequin shown in the drawings is essentially composed of three parts; namely, a body 10, head 12, and connecting member 14, which joins the body and head. THe body and head are each molded of a rubber-like material which approximates the flexibility and resilience of the human body. The connecting member 14 typically may be molded of a rigid plastic material having sufficient strength to withstand the forces to which it is normally subjected. The particular materials from which the head, body and connecting member are made of course are not essential features of this invention.

Body 10 is essentially a replica of the upper torso of the human, having a chest 16, shoulders 18 and neck 20. The neck 20 is in the form of a generally circular collar which receives the neck portion 22 of head 12. Body 10 is generally of hollow configuration having a large open chest cavity inside.

Head 12 as suggested preferably possesses flexibility that aproaches that of a human face. The face is formed with eyes, ears, nose, and mouth, and the nose and mouth as described below are provided with internal "breathing" passages. In the embodiment of FIG. 2, mouth 24 of head 12 communicates directly with a passage 26 that extends inwardly from the mannequin's lips 28, and nose 30 includes a pair of passages 32 and 34 that extend inwardly and connect to the inner end 36 of passage 26. Thus, the three passages 26, 32 and 34 have a common outlet 38 which lies on the inner surface 40 of round socket 42 formed as an integral part of the head. Socket 42 is supported within the head on the upper end of column 44 which joins the neck portion 22 of the head at the bottom surface 46. The end 38 of the passages in the head spans an arc of approximately 45° in the surface 40 and extends generally horizontally with respect to the head when the head is in the upright position. The vertical extent of opening 38 is quite small, extending only a few degrees top to bottom.

The connecting member 14 which joins the body 10 and head 12 includes a base or support 50 which is generally circular in plan and is sized to fit rather snugly in the neck collar 20 of the body. The support carries a pair of bosses 52 which extend horizontally in opposite directions on each side of the support and fit within circular openings 54 provided in collar 20 so as to define a pivotal axis for the connecting member 14 in the body. It is evident in the drawing that the connecting member 14 may be pivoted about the axis of bosses 52, which permits the head 12 to be raised and lowered on the body 10 when the mannequin is in the horizontal position.

Support 50 carries a rigid extension 56 in the form of a post which in turn carries a ball 58 at its upper end. The ball 58 is sized to snap into socket 42 with the ball surface 60 in contact with surface 40 of the socket. Because socket 42 is somewhat greater than a hemisphere, the ball may not be pulled from the socket except with sufficient force to spread the margin 61 of socket opening 63. Thus, the mannequin head will not accidentally detach from the connecting member.

The upper surface 62 of collar 50 is dish-shaped and essentially corresponds to the shape of the lower surface 46 of the neck 22 of head 12. Therefore, when the head is moved with respect to the body by means of connecting member 14, the surfaces 62 and 46 do not interfere with that movement but rather freely permit it.

A passage 64 extends through the connecting member 14 from the lower surface of support 50 through extension 56 and ball 58 to opening 66 in the ball surface 60, which in size and shape generally corresponds to the size of opening 38 in socket surface 40. It is evident in FIG. 3 that the openings 38 and 66 may be aligned with one another by moving the head on the ball. When the openings are aligned, there is a continuous passage both from the mouth 24 and nose 30 of head 12 to the chest cavity in the body 10 of the mannequin.

The center of socket 42 is generally aligned with the approximate location of what would be the rear ends of the jaw bone of the mannequin's head. And the connecting member 14 permits movement of the head on the body both about the axis defined by the bosses 52 and about the center of the ball and socket connection. In order to register openings 38 and 66, the head must be tilted back to the position shown in FIG. 1. Very little deviation is permitted from the tilted position shown while maintaining registration of the two openings. However, the head may be turned in the tilted position side to side with respect to the body almost 90° in each direction while maintaining some overlap between the ends of the openings 38 and 66. Thus, with the head tilted back, it may be turned either to the left or right while maintaining the registration of the two passages.

The connecting member 14 requires that the head of the mannequin be quite precisely positioned in order to open the passage between the nose and mouth and the body. The position which achieves that condition is the same position as is actually required to open the airway in the human body so as to allow resuscitation to take place. It is well kwown that in order to give effective mouth to mouth resuscitation or to provide resuscitation through some mechanical device the head must be dropped back just as is shown in FIG. 1 (the shoulders of the victim preferably are raised to assist in dropping the head back) in order to open the airway. The connecting member 14 allows the mannequin to simulate normal head movement, and the attendant is required to correctly position the head as he would the head of a victim in order to open the airway between the nose and mouth and the lungs. And as with a human, the attendant can turn the head to one side or the other to simulate the position in which a head should be placed to allow fluids to spill from the mouth.

Because the head is molded of a flexible material the jaw 70 may be moved a limited distance so as to open and close the mouth 24. When mouth to mouth resuscitation is practiced, the student may open the mouth fairly wide so as to allow for the free flow of air into passage 26.

In FIGS. 4–7 a preferred mannequin nasal passage construction is shown, which is easier to manufacture than the form of FIG. 2. In this form the nasal passages are constructed in what is otherwise an essentially solid portion 100 of the head 102 rather than by tubes extending through an essentially hollow portion of the head as in FIG. 2. The passages in this preferred form are formed by a preshaped solid insert 104 disposed in a mating cavity 106 between the nose 108 and mouth 110.

In the drawings the cavity is shown to have parallel vertical side walls 112 and 114 extending rearwardly from the face, and a horizontal flat top surface 116 at the bottom of the nose. The lower end of the cavity lies in mouth passage 118. Insert 104 conforms to the shape of the cavity except that the rear vertical edges are cut away as shown at 120 to define nasal passages extending from the nostrils 122 to mouth passage 118.

The upper surface of the forward portion of mouth passage 118 just rearwardly of cavity 106 is beveled as suggested at 124 so as to enlarge the connection between the nasal passages 120 and mouth passage 118. This allows continued communication between the nasal passages and the mouth passage even when the forwardmost part 124 of the passage defined by the bottom of insert 104 and lower lip 126 is pinched closed. It will of course, be appreciated that the rear portion of passage 118 terminates at the socket which receives ball 58 in the same manner as in the embodiment of FIG. 2.

Having described this invention in detail, those skilled in the art will appreciate that numerous modifications may be made of this invention without departing from its spirit. Therefore, I do not intend to limit the breadth of this invention to the single embodiment illustrated and described. Rather, it is intended that the scope of this invention be determined by the appended claims and their equivalents.

What is claimed is:

1. A mannequin for teaching lung ventilation comprising
    a collar for representing the neck of a human body,
    a support pivotally connected to the collar with the pivotal axis extending from side to side of the neck,
    an extension carried by and fixed at one end to the support and carrying a ball at its free end,
    a head simulating the head of a human and having a nose and mouth and also having a neck portion with a socket which receives the ball, said ball and socket enabling the head to tilt back and forth and turn side to side on the ball,
    an air passage in the head from the mouth to the socket,
    a second passage in the ball and extension and communicating with the passage in the head when the head is tilted back to a selected position,
    said second passage being open to said collar,
    said support being generally dish shaped at the end facing the head and having a pair of bosses extending outwardly therefrom in opposite directions and defining a pivotal axis for the support on the collar,
    said collar having a pair of aligned openings therein for releasably receiving the bosses,
    and said head having a rounded bottom surface at the neck and complementing the dish shaped configuration of the support so that the round bottom surface can move on the support when the support is pivoted on the collar and the head is moved on the ball.

* * * * *

UNITED STATES PATENT OFFICE
CERTIFICATE OF CORRECTION

Patent No. 3,916,535          Dated Nov. 4, 1975

Inventor(s) Carl Hewson

It is certified that error appears in the above-identified patent and that said Letters Patent are hereby corrected as shown below:

Column 1; line 43, after "positioned" add --for--.

Column 2; line 14, correct "aproaches" to read --approaches--.

Column 3; line 28, correct "kwown" to read --known--.

Signed and Sealed this twentieth Day of April 1976

[SEAL]

Attest:

RUTH C. MASON
Attesting Officer

C. MARSHALL DANN
Commissioner of Patents and Trademarks